United States Patent
Verhoeven et al.

(10) Patent No.: US 8,235,581 B2
(45) Date of Patent: Aug. 7, 2012

(54) MIXING DEVICE COMPRISING A ROTOR RIB

(75) Inventors: Ramon Eduard Verhoeven, Heerhugowaard (NL); Carlos Nicolaas Jozef Maria Koopman, Heerhugowaard (NL)

(73) Assignee: Bravilor Holding B.V. (NL)

( * ) Notice: Subject to any disclaimer, the term of this patent is extended or adjusted under 35 U.S.C. 154(b) by 643 days.

(21) Appl. No.: 12/375,271

(22) PCT Filed: Jul. 26, 2007

(86) PCT No.: PCT/NL2007/050372
§ 371 (c)(1),
(2), (4) Date: Jan. 27, 2009

(87) PCT Pub. No.: WO2008/013452
PCT Pub. Date: Jan. 31, 2008

(65) Prior Publication Data
US 2009/0324792 A1 Dec. 31, 2009

(30) Foreign Application Priority Data

Jul. 28, 2006 (NL) .................................... 2000166

(51) Int. Cl.
*A47J 31/40* (2006.01)
(52) U.S. Cl. ............... 366/165.2; 366/165.3; 366/171.1; 366/307; 222/129.1; 222/145.6; 99/300
(58) Field of Classification Search .................... 366/64, 366/134, 165.3, 168.1, 172.1, 262–265, 279, 366/608, 171.1, 307, 165.2; 426/519; 222/145.5–145.6, 235, 129.1; 99/287, 300
See application file for complete search history.

(56) References Cited

U.S. PATENT DOCUMENTS

| | | | | |
|---|---|---|---|---|
| 3,012,763 A | * | 12/1961 | Martin | 416/222 |
| 3,140,861 A | * | 7/1964 | Krup | 366/156.1 |
| 3,212,757 A | * | 10/1965 | Maxson et al. | 366/165.2 |
| 3,266,670 A | * | 8/1966 | Brooks et al. | 222/54 |
| 4,185,927 A | * | 1/1980 | Uttech | 366/131 |
| 4,193,522 A | | 3/1980 | Edelbach | |
| 4,676,401 A | * | 6/1987 | Fox et al. | 222/1 |
| 5,466,334 A | * | 11/1995 | Fredriksson et al. | 162/56 |

(Continued)

FOREIGN PATENT DOCUMENTS

DE 2401001 7/1975
(Continued)

*Primary Examiner* — Charles E Cooley
(74) *Attorney, Agent, or Firm* — Fliesler Meyer LLP

(57) ABSTRACT

The present invention relates to a mixing device for mixing a liquid, such as water, with an instant ingredient to form a beverage. The mixing device comprises a mixing chamber and a rotor which, during rotation about the axis of rotation, defines a surface of revolution extending along the circumference of the rotor. The rotor is arranged in the mixing chamber. The mixing chamber comprises a peripheral wall zone having a substantially circular cross section. The peripheral wall zone surrounds the surface of revolution. An outlet duct for discharging the mixture formed is connected to the mixing chamber. The inlet of the outlet duct is provided at the rotor. At least one rotor rib is provided at the peripheral wall zone. This rotor rib extends from the peripheral wall zone in the direction of the surface of revolution of the rotor. The invention furthermore relates to a beverage-making device comprising a mixing device according to the invention, as well as to the use of a mixing device according to the invention.

9 Claims, 5 Drawing Sheets

U.S. PATENT DOCUMENTS

| | | | |
|---|---|---|---|
| 5,660,468 A * | 8/1997 | Okajima et al. | 366/306 |
| 5,918,768 A * | 7/1999 | Ford | 222/113 |
| 5,927,553 A * | 7/1999 | Ford | 222/129.4 |
| 6,109,780 A | 8/2000 | Lesniak | 366/253 |
| 6,698,625 B2 * | 3/2004 | Ufheil et al. | 222/190 |
| 6,729,753 B2 * | 5/2004 | Artman et al. | 366/164.6 |
| 7,059,498 B2 * | 6/2006 | Ufheil et al. | 222/190 |
| 7,464,835 B2 * | 12/2008 | Coronado et al. | 222/145.6 |
| 7,934,866 B2 * | 5/2011 | Koopman et al. | 366/165.3 |
| 8,038,033 B2 * | 10/2011 | Crow et al. | 222/145.6 |
| 2003/0150879 A1 * | 8/2003 | Ufheil et al. | 222/190 |
| 2003/0189872 A1 * | 10/2003 | Artman et al. | 366/165.3 |
| 2005/0079265 A1 * | 4/2005 | Ufheil et al. | 426/569 |
| 2008/0233264 A1 * | 9/2008 | Doglioni Majer | 426/594 |
| 2009/0202695 A1 * | 8/2009 | Koopman et al. | 426/519 |
| 2009/0324792 A1 * | 12/2009 | Verhoeven et al. | 426/519 |
| 2010/0018406 A1 * | 1/2010 | Koopman et al. | 99/300 |
| 2011/0158036 A1 * | 6/2011 | Koopman et al. | 366/144 |

FOREIGN PATENT DOCUMENTS

| | | |
|---|---|---|
| EP | 1116464 | 7/2001 |
| EP | 1116464 A1 * | 7/2001 |
| EP | 1316283 | 6/2003 |
| EP | 1639924 | 3/2006 |
| WO | 03/068039 | 8/2003 |

* cited by examiner

MIXING DEVICE COMPRISING A ROTOR RIB

This application is a national stage application that claims priority under 35 U.S.C. 371 to Patent Cooperation Treaty Application No. PCT/NL2007/050372, entitled "Mixing device comprising a rotor rib," inventors Ramon Eduard Verhoeven et al., filed Jul. 26, 2007, and which has been published as Publication No. WO2008/013452, which application is herein incorporated by reference.

TECHNICAL FIELD OF THE INVENTION

The present invention relates to the field of preparing an instant beverage. The present invention relates in particular to a mixing device used therefor for mixing a liquid, such as hot or cold water, with an instant ingredient, such as an instant powder or an instant liquid, to form a beverage.

BACKGROUND OF THE INVENTION

Mixing devices in the field of preparing instant beverages are known. An example which may be mentioned is WO 03/068039.

Such mixing devices are required in order to mix the liquid, usually hot or cold water, with the instant ingredient, in the case of WO 03/068039 an instant powder. Referring to said example WO 03/068039, such a mixing device has a mixing chamber containing a rotor. The mixing chamber is usually subdivided into an inlet chamber and a rotor chamber. At the top, the inlet chamber is provided with an access opening through which portions of instant powder are delivered to the inlet chamber. The inlet chamber furthermore has an inlet mouth by means of which the hot water is supplied. When the inlet chamber is round and the inlet is oriented radially, mixing occurs in the inlet chamber as a result of the liquid making a circular motion. From the inlet chamber, the liquid with the instant powder passes to the rotor chamber in which the rotor is located. The rotor is, as is also the case in WO 03/068039, usually arranged so that it rotates about a horizontal axis of rotation. As a result thereof, a pipe bend is usually provided between the inlet chamber and the rotor chamber. The rotor may perform various functions, optionally in combination, and may, partly for this reason, have various forms. One function is to improve the mixing. Another function is foaming up the beverage by mixing in air or by another way. Yet another function is a conveying function. Furthermore, an outlet is connected to the mixing chamber, usually to the rotor chamber near the rotor, in order to discharge the mixture produced, generally into a container, such as a beaker, mug, cup or pot, from which the beverage can be drunk or poured. The outlet is generally horizontally oriented and has a discharge part at the end having an outflow opening which is directed downwards by means of a bend.

The known mixing devices for preparing an instant beverage have various shortcomings, that is to say there are various points which can be improved upon.

One of the points which can be improved upon is the operation of the rotor. There are many known patent applications which are aimed at improving the operation of the rotor.

Thus, it is known from WO 03068039 to design the surface of revolution defined by the rotating rotor as a tapering surface and to make it of such a length and size that it results in a high foaming efficiency. The surface of revolution of the rotor is in this case provided with grooves which extend along a curved line in the axial direction. The solution in this case consists of specific angles for the taper of the surface of revolution, specific rotation speeds, specific gap widths between the surface of revolution of the rotor and the surrounding peripheral wall zone of the rotor housing; specific gap widths between the axial end surfaces of the rotor and the rotor housing.

Furthermore, reference may be made to EP 1.639.924, which, taking the publication mentioned above as starting point, discloses further features of the surface of revolution of the rotor in order to improve the operation of the rotor.

In order to prevent problems with the operation of the rotor as a result of lumps of instant powder which have not dissolved, EP 1.116464 describes providing a screen upstream of the rotor which stops such lumps of instant powder which have not dissolved.

All in all, various shapes of rotors are known, the design of which is usually based on the starting point of enlarging the contact surface of the rotor, which is then often effected by means of recesses and/or ribs in the surface of revolution of the rotor.

It is an object of the present invention to further improve the effect of the rotor for the purpose of foam-formation and/or improved mixing action and/or otherwise.

SUMMARY OF THE INVENTION

This object is achieved according to the invention—using the most current prior art as starting point, for the time being WO 03/068039—by providing a mixing device for mixing a liquid, such as hot or cold water, with an instant ingredient, such as an instant powder or instant liquid, to form a beverage, the mixing device comprising:
 a mixing chamber;
 a rotor;
in which the rotor is arranged in the mixing chamber;
in which the mixing chamber comprises a peripheral wall zone having a substantially circular cross section, which peripheral wall zone surrounds the surface of revolution;
in which an outlet duct for discharging the mixture formed is connected to the mixing chamber,
the inlet of which is provided at the rotor;
characterized in that
at least one rotor rib is provided at the peripheral wall zone; and
in which this rotor rib extends from the peripheral wall zone in the direction of the surface of revolution of the rotor.

Providing at least one rib here, referred to as rotor rib, on the peripheral wall zone, which extends from the peripheral wall zone in the direction of the surface of revolution of the rotor, results in the liquid which is forced outwards by the rotor being returned in the radial direction towards the rotor due to the at least one rotor rib which is provided on the peripheral wall zone. This ensures that this liquid is again subjected to the action of the rotor and thus increases the operational efficiency of the rotor. As a result of all this, the liquid around the rotor will become more turbulent. Returning the liquid from the peripheral wall zone towards the rotor is in this case effected, according to the inventors, by the fact that the liquid which is forced outwards wants to move along the peripheral wall zone in the circumferential direction of the rotor and is then pushed against the rotor rib and thus deflected inwards in the radial direction, towards the rotor.

In this case, the circumferential wall zone of the mixing chamber is understood to mean the zone of the inner wall of the mixing chamber which—viewed in the radial direction of the rotor—overlaps the surface of revolution of the rotor.

In order to return the liquid effectively from the peripheral wall zone in the direction of the rotor, it is advantageous in this case, if this rotor rib extends along the entire axial length of the rotor. In this case, the rotor rib may, in addition to the axial extending direction, also have a radial and/or tangential extending direction.

According to another embodiment of the invention, it is advantageous if this, at least one rotor rib, viewed in a plane at right angles to the axis of rotation, has a triangular cross-sectional shape. With a triangular cross-sectional shape, the liquid which moves along the peripheral wall zone and is forced against the rotor rib, will be returned more efficiently in the direction of the rotor, thus preventing the formation of a more or less stationary layer of liquid along the peripheral wall zone on the side of the rib which faces in the direction opposite to the rotation of the rotor.

In this case, it is furthermore advantageous if this at least one rotor rib comprises an angular edge extending in the axial direction. Such an angular edge promotes the generation of turbulence in the liquid. Increasing turbulence is advantageous with a view to the mixing action and/or foam formation.

According to a further embodiment, it is advantageous if this at least one rotor rib, viewed in the radial direction of the rotor, has a height of 1 to 3 mm, such as approximately 2 mm; and if the radial tolerance between the surface of revolution and this at least one rotor rib is 0.5 to 2 mm, such as approximately 1 mm. Using such dimensions for, on the one hand, the tolerance between the rotor and the rotor rib, and, on the other hand, the height of the rib, makes it possible, on the one hand, for the rotor to rotate past the rib in a sufficiently smooth manner and, on the other hand, provides sufficient space next to the rib in order to collect the liquid which has been forced outwards and return it inwards, back towards the rotor.

According to the invention, it is furthermore advantageous, if the inlet of the outlet duct is provided at the surface of revolution of the rotor and the outlet duct extends in the axial direction of the rotor at the inlet; and if said at least one rotor rib is provided on both sides of the inlet of this outlet duct, directly adjacent to this inlet. This results in the liquid which has been forced outwards by the rotor not readily disappearing via the outlet duct and therefore staying in the mixing chamber for longer.

According to a further embodiment of the mixing device according to the invention, the rotor has a rear side which is delimited by a rear rotor housing wall; the mixing chamber is designed to supply the mixture comprising liquid and instant ingredient, such as instant powder or instant liquid, from the front side of the rotor to the rotor; the front side of the rotor is partially delimited by a front rotor housing wall; and the inlet of the outlet duct is provided in the front rotor housing wall. Thus, an efficient arrangement is achieved, with the supply to the rotor and the outlet from the rotor being provided on the same side, so that the motor for driving the rotor can be provided on the other side of the rotor, relatively close to the rotor.

According to a further aspect, the invention relates to a beverage-making device for preparing a hot or cold instant beverage, the beverage-making device comprising: at least one mixing device according to the invention;
- a water supply system for the supply of hot or cold water to an inlet mouth to the mixing chamber of the at least one mixing device;
- at least one storage container for instant ingredient such as instant powder or instant liquid;
- an ingredient supply duct which connects the storage container to an access opening to the mixing chamber of the at least one mixing device.

According to yet a further aspect, the present invention relates to the use of a mixing device according to the invention for preparing a hot or cold instant beverage, such as soup, coffee, hot cocoa, tea, bouillon, lemonade or fruit juice.

EMBODIMENT OF THE INVENTION

The present invention will be explained below with reference to an embodiment illustrated in the drawing, in which.

Figure 1:
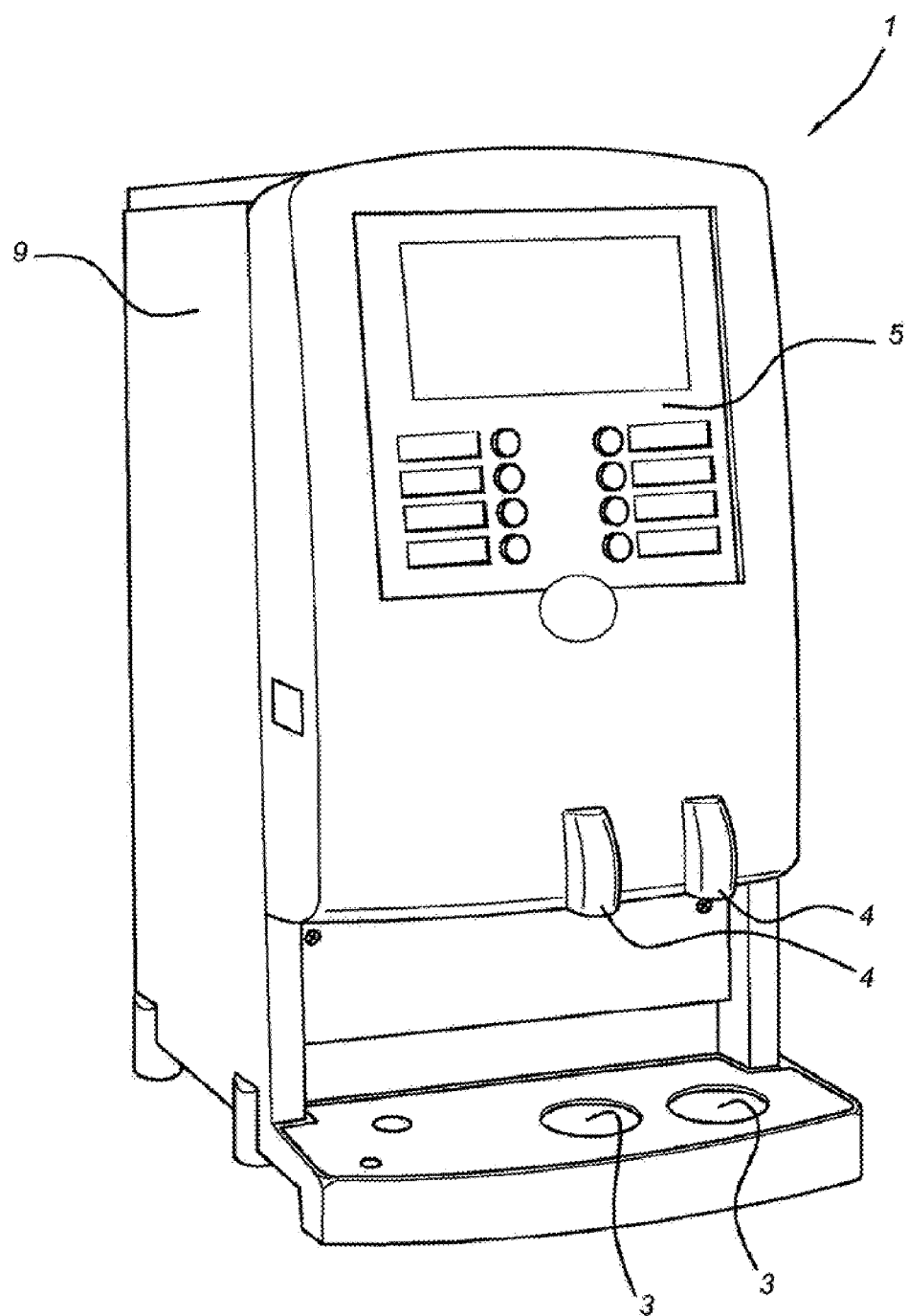
FIG. 1 shows a diagrammatic perspective view of a beverage-making device according to the invention.
Figure 2:
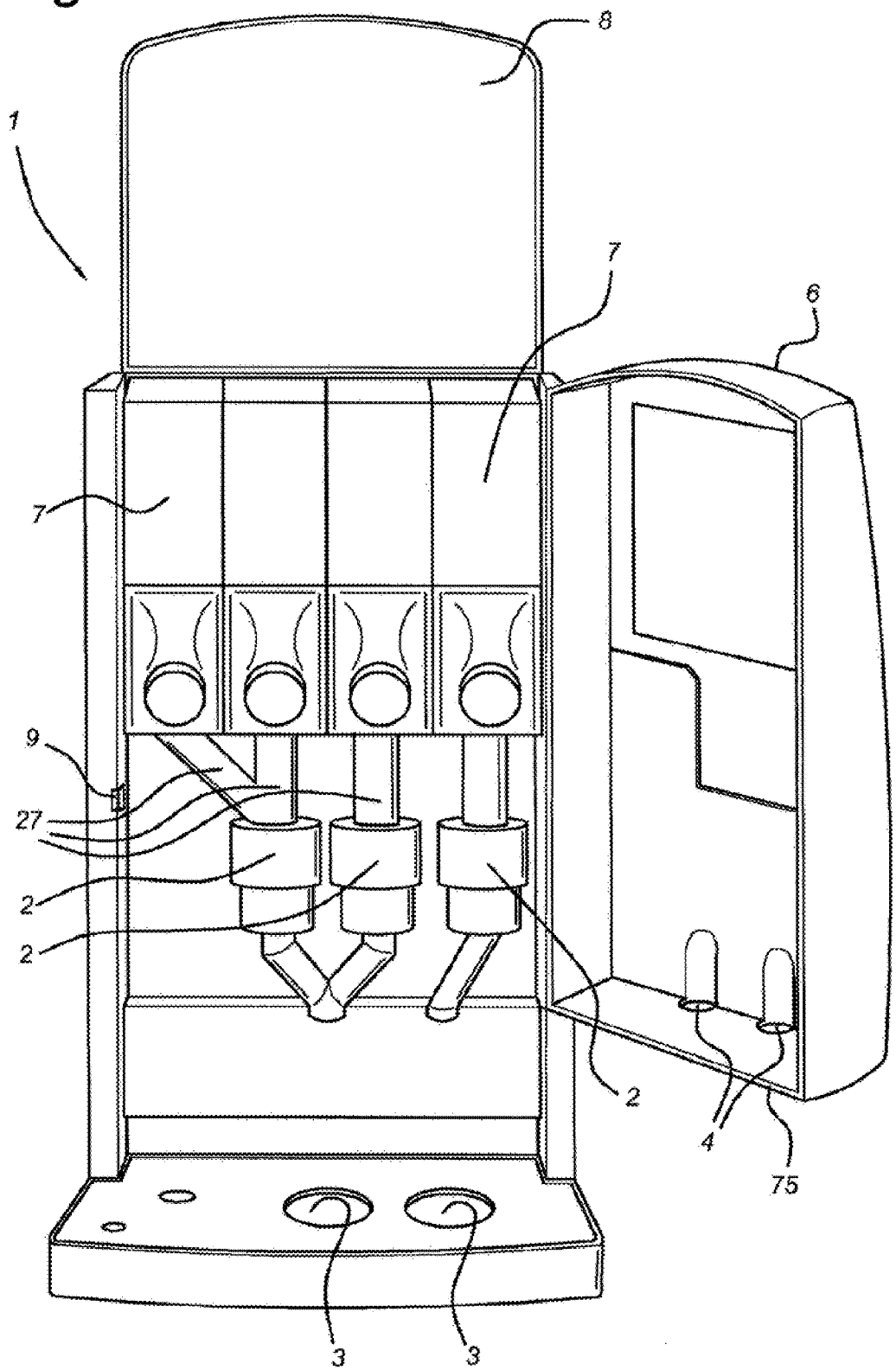
FIG. 2 shows a diagrammatic perspective view of the beverage-making device according to the invention in an open position.

FIGS. 1 and 2 show diagrammatic perspective views of a beverage-making device 1 according to the invention. This beverage-making device comprises a substantially closed cabinet 9, a hinged cover 8, and a hinged door 6. A control panel 5 is provided on the door 6, by means of which control panel 5 the user can choose a specific beverage. At the front, at the bottom, two positioning locations 3 for a cup or mug are provided on a panel. Above each positioning location 3, a dispensing point 4 for the beverage is provided in the door 5.

When the door is open, see FIG. 2, 4 storage containers 7 can be seen. Each storage container may contain a different base material for preparing an instant beverage. Thus, for example, the left-hand container 7 may contain milk powder, the second container from the left instant coffee powder for cappuccino, the third container from the left instant coffee powder for standard or espresso coffee, and the right-hand container instant soup powder. The containers may also contain instant liquid instead of instant powder, and it is also possible for containers with instant powder to be provided in addition to containers with instant liquid.

Beneath the storage containers 7, there are 3 mixing devices according to the invention which are connected to the storage containers via powder supply ducts. It should be noted that a beverage-making device according to the invention may also be provided with fewer or more mixing devices according to the invention.

In accordance with standard NEN-EN-IEC60335-2-75, three so-called "areas" can be distinguished in the beverage-making device according to the invention, i.e. the so-called "user area" (article 3.109 of the standard), the so-called "maintenance area" (article 3.110 of the standard), and the so-called "service area" (article 3.111 of the standard).

The user area is the space where the user obtains the beverage. The user area is thus essentially the area which is accessible from the outside, as illustrated in FIG. 1.

The maintenance area is the space where the standard, usually daily, maintenance is carried out, in particular refilling the storage containers. In order to give access to the maintenance area, a hinged door 6 is provided at the front of the beverage-making device 1 and a hinged cover 8 is provided at the top of the beverage-making device 1. The hinged cover 8 can incidentally also be omitted.

The so-called service area is situated in the space enclosed by the cabinet-shaped frame 9. This service area is only accessible to technical maintenance personnel. The service area contains electrical parts, such as the power supply, electric motors, heating means, etc.

Figure 3:
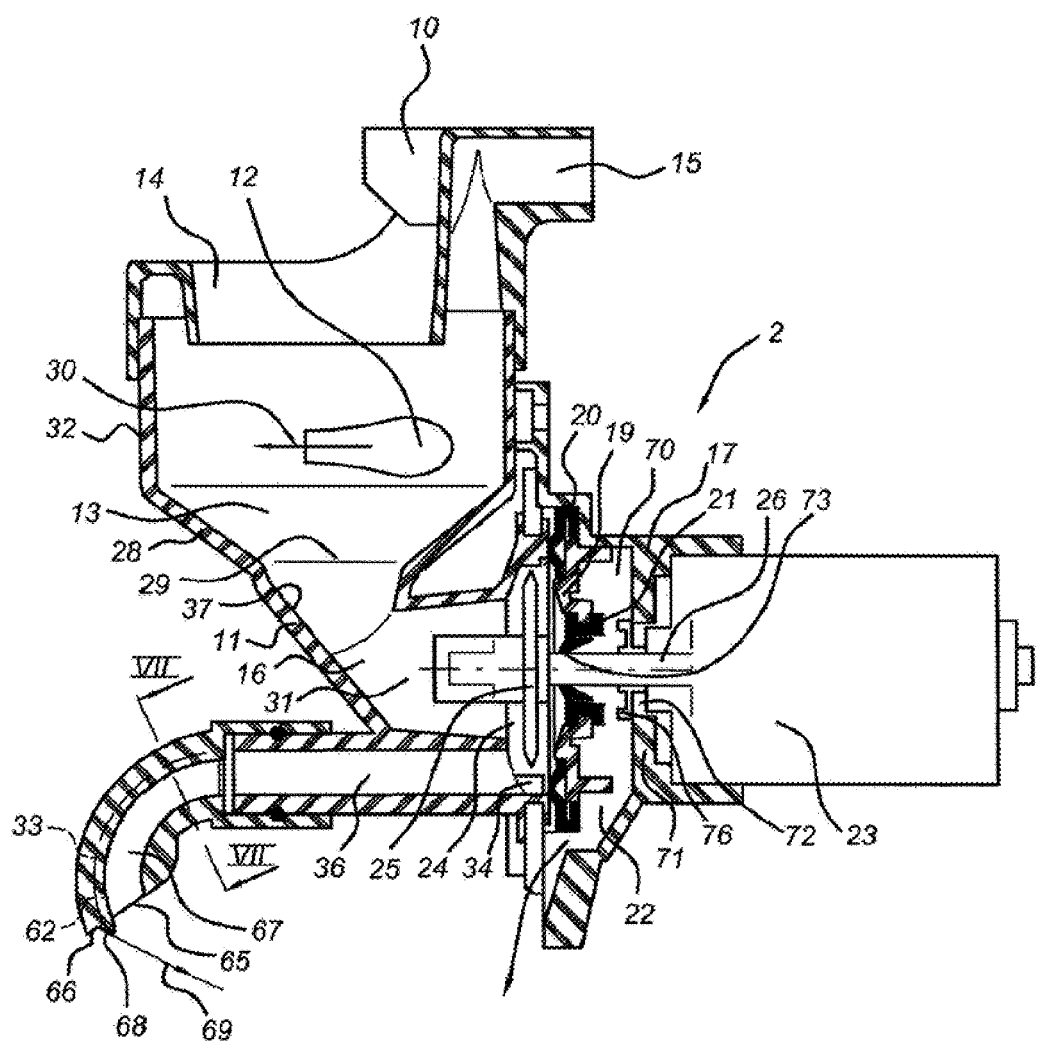
FIG. 3 shows a diagrammatic cross section of a mixing device according to the invention.

FIG. 3 shows a cross section of a mixing device according to the invention. This mixing device 2 will initially be discussed in general terms without yet going into detail about the invention itself.

The mixing device 2 comprises a mixing chamber 13, 16, 14. The mixing chamber is subdivided into an inlet chamber 13, a rotor chamber 14 and a pipe bend 16 which connects the inlet chamber 13 to the rotor chamber 24. The rotor chamber 24 contains a rotor 25. The rotor 25 is driven by an electric motor 23, or electromotor for short. This electromotor 23 is placed outside the rotor chamber and connected to the rotor 25 by means of a drive shaft 26.

An extractor hood 10 is provided on the inlet chamber 13. This extractor hood 10 delimits an access opening 14 to the inlet chamber 13. The extractor hood 10 furthermore has a connection 15 for connecting to an extraction duct. As can be seen in FIG. 2, one or more powder supply ducts 27 end in the access opening 14. In use, instant powder, at least portions of instant powder, are supplied to the inlet chamber 13 via these powder supply ducts 27. In the inlet chamber 13, there is furthermore an inlet mouth 12 for the supply of hot water. This hot water is supplied in the horizontal direction, in the direction indicated by arrow 30, in order to flow out in the inlet chamber. Due to the fact that the inlet chamber is bowl-shaped, the hot water will thus carry out a swirling motion. The instant powder, which is fed into the inlet chamber via access opening 14, will consequently already be mixed with the hot water in the inlet chamber and be able to completely or partially dissolve in the process.

Due to the presence of hot water, there will be vapour in the inlet chamber 13 and due to the presence of the instant powder, there will also be fine powder particles floating in the vapour in the inlet chamber 13. It will be clear that this vapour should not enter the powder supply ducts 27 and the extractor hood 10 has been provided for this very reason. In use, air will be extracted from the inlet chamber 13 via the connection 15, so that vapour and fine powder particles are removed to the surrounding area.

The bottom 28 of the inlet chamber 13 is of an, as it were, funnel like design, in this case about conical, in order to end up centrally at the inlet opening 29 of the pipe bend 16. This pipe bend 16 bends through approximately 90° in order to end at the outlet opening 31 of the pipe bend 16 in the rotor chamber 24.

The mixture undergoes further treatment by the rotor 25 in the rotor chamber 24. According to the invention, this rotor can be of varying design. The rotor illustrated in FIG. 3 is substantially planar and disc-shaped. However, the rotor may also be of a different design, for example similar to the rotor of EP 1,639,924 or similar to the rotor of WO 03/068039.

At the rear, the rotor chamber 24 is delimited by a rear wall 19, which is also referred to in this patent application by the term first wall part. This first wall part 19 is provided with a shaft seal 21 through which the drive shaft 26 protrudes into the rotor chamber 24.

The rear wall 19 is accommodated in the motor support 17 which supports the electromotor 23. During fitting, the motor support 17 is attached to the front wall of the cabinet 9. The motor support 17 furthermore supports the housing 32 in which the mixing chamber is accommodated. The rear wall 19 is provided with a flexible seal 20 along the periphery against which a rib 34 of the mixing chamber housing 32 forms a seal.

The mixing chamber housing 32 is furthermore provided with an outlet duct 36, 33 for discharging the mixture formed in the mixing chamber 13, 16, 24. The outlet duct 36, 33 comprises a straight segment 36 and a discharge part 33 by means of which the mixture is dispensed in the cup or beaker. Referring to FIG. 2, it will be clear that a pipe or otherwise a duct may be provided between the straight segment 36 and the discharge duct 33 if the mixing device 2 is not provided perpendicularly above the positioning location.

Although the mixing device according to the invention has been described above as a mixing device for mixing an instant powder with a liquid, in particular water, it should be noted that the mixing device according to the invention may very well be of the type in which an instant liquid—in practice often referred to as 'liquid ingredient'—is mixed with water. The viscosity of such a liquid ingredient can, according to the invention, vary from low to high—and may even be extremely viscous. According to the invention, such a liquid ingredient may, for example, be a concentrated extract or condensed liquid. It will be clear to the person skilled in the art that the supply to the mixing chamber may be designed differently in the case of a liquid ingredient. The extractor hood can be omitted completely (but can also remain in place). The shape of the inlet chamber may be different (but may also be approximately the same, if desired).

Furthermore, it should be noted that the mixing device according to the invention can be used for preparing both hot and cold beverages. According to the invention, hot beverages can be prepared both from instant powder and from an instant liquid, or so-called 'liquid ingredient'. The same applies to cold beverages. According to the invention, cold beverages can also be prepared both from an instant powder and from an instant liquid, or so-called 'liquid ingredient'.

The invention, and more particularly a number of improvements which the invention provides to the mixing device according to the invention, will be discussed in more detail below. These improvements are in four different areas. A first improvement of the mixing device according to the invention relates to the pipe bend 16. A second improvement of the mixing device according to the invention relates to improving the operation of the rotor 25. A third improvement of the mixing device according to the invention relates to the outlet duct 36, 33. A fourth improvement of the mixing device according to the invention relates to reducing the number of defects of the electromotor 23.

Figure 4:
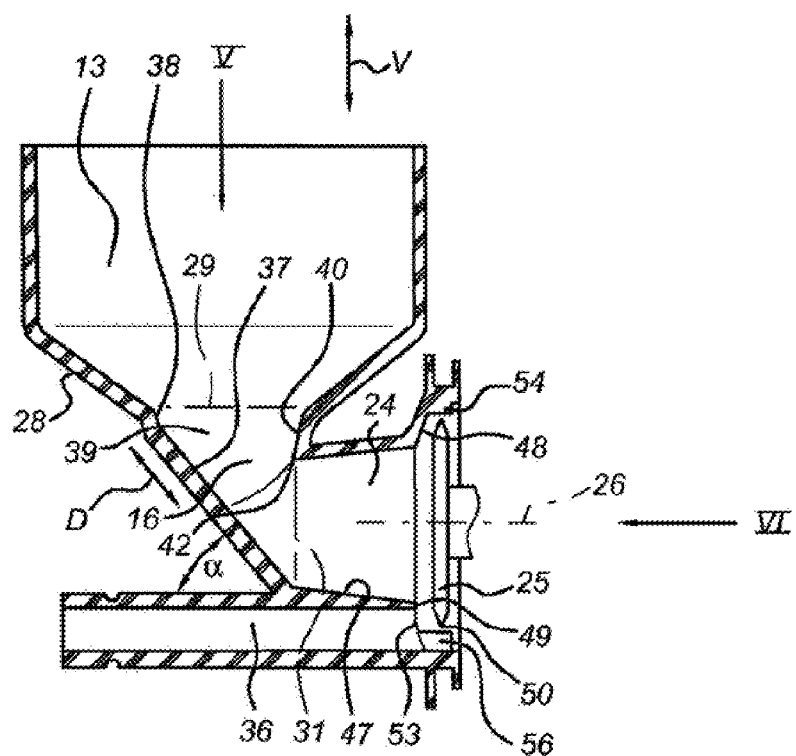
FIG. 4 shows a diagrammatic cross section of a detail of the mixing device according to FIG. 3.
Figure 5:
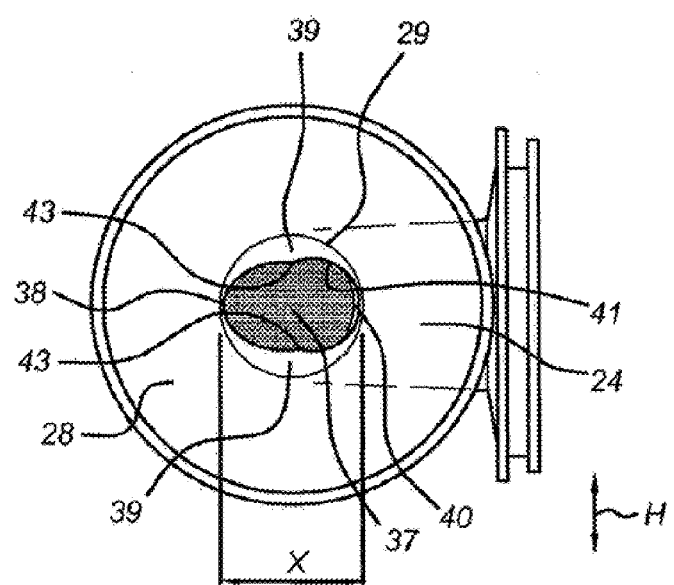
FIG. 5 shows a diagrammatic top view in the direction indicated by arrow V in FIG. 4 of the detail from FIG. 4.
Figure 6:
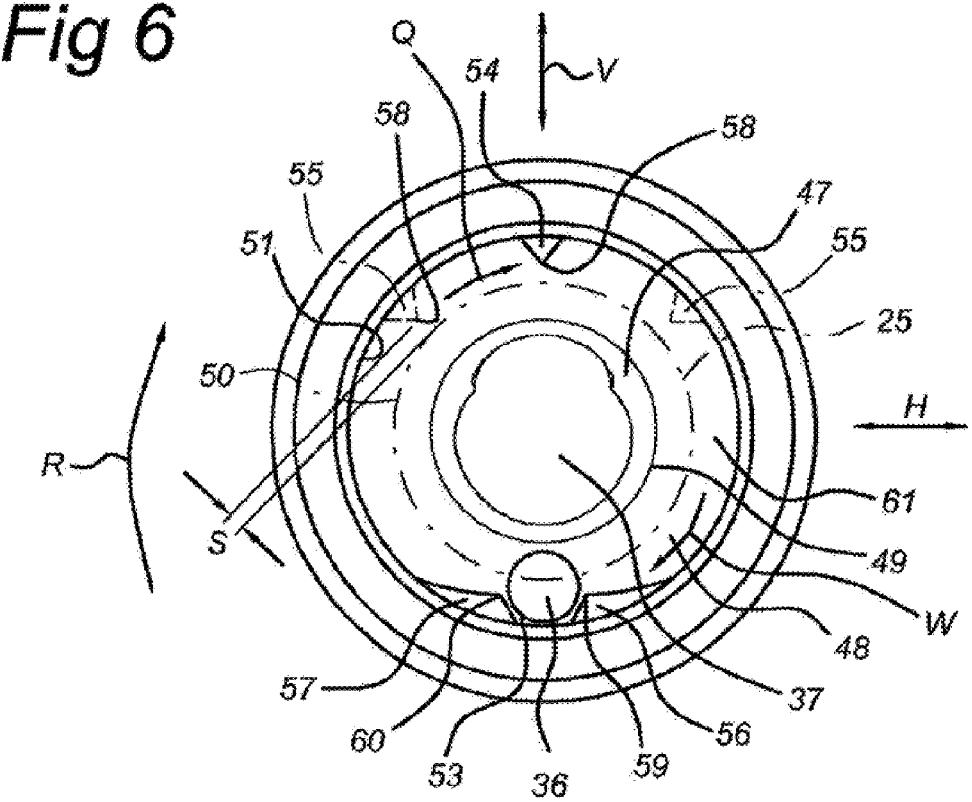
FIG. 6 shows a diagrammatic top view in the direction indicated by arrow VI in FIG. 4 and FIG. 5 of the detail from FIG. 4.

As can partly be seen in FIG. 3, the side of the outer curve 11 of the pipe bend 16 is designed as a planar surface 37 with the pipe bend 16 according to the invention. This planar surface 37 is shown in more detail in the diagrammatic FIGS. 4, 5 and 6 which only show a detail of the unit. FIG. 4 in this case shows a diagrammatic cross-sectional representation according to that of FIG. 3. FIG. 5 shows a view in the direction indicated by arrow V in FIG. 4 and FIG. 6 shows a view in the direction indicated by arrows VI in FIGS. 4 and 5. In FIG. 5, the planar surface 37 has been made easier to distinguish by shading it. In FIG. 6, the rotor has only been indicated by means of a dashed circle 25 in order to indicate its position and, apart from that, to provide a clear view in the rotor chamber 24 to the inclined surface 37.

Referring to FIGS. 4, 5 and 6, it can be seen that the entire side of the outer curve of the pipe bend 16 is designed as a planar surface 37. The conical bottom 28 of the inlet chamber 13 has an opening in the centre, which opening also forms the inlet opening 29 of the pipe bend 16. With the interposition of a small conical transition edge 38—which is approximately 1-2 mm high in the vertical direction—this planar surface 37 here not only adjoins the inlet opening 29 of the pipe bend but also the bottom 28 of the inlet chamber 13.

Referring to FIG. 5, it can be seen that, due to the fact that the entry side of the pipe bend 16 tapers slightly, there are tapering, in particular conical wall zones 39 on either side of the pipe bend which run obliquely and steeply from the bottom 28 of the inlet chamber 13 towards the otherwise planar surface 37. Such a tapering curved surface 40 can also be seen on the side of the inner curve, see FIGS. 4 and 5.

The planar surface 37 is defined by a first direction H, which runs in the horizontal direction (see the double arrow H in FIG. 5) and a second direction D, which runs at right angles to this first direction H. This second direction is indicated in FIG. 4 by means of the double arrow D. The planar surface 37 is at an angle α with respect to the horizontal plane. In the embodiment as illustrated in FIGS. 3-6, α is 45°. The double arrow D is thus at an angle of 45° with respect to both the double arrow H which indicates the horizontal direction and the double arrow V which indicates the vertical direction. In this case, according to the invention the expression planar surface is understood to mean that the surface is planar in the extending direction D and also in the extending direction H. In the extending directions H and D, the surface 37 is therefore not curved, but straight over a certain distance larger than 0 (zero) cm, such as over a distance of at least 0.5 cm.

FIG. 4 shows that, on the side of the inner curve, the pipe bend has an angular transition 42. This angular transition 42 forms the centre of an arcuate arc edge 41 (see FIG. 5) which is of an angular design overall. This arc edge 41 is C-shaped and has two free ends 43 by which the arc edge 41 adjoins the planar surface 37 (see FIG. 5).

In order to illustrate the overall position of the planar surface 37 in more detail, the planar surface 37 is shaded in FIG. 5.

FIG. 5, which is a view in the direction indicated by arrow V in FIG. 4, also shows the so-called vertical projection of the planar surface 37 on the inlet opening 29. This is that section of the planar surface which in the view from FIG. 5 is actually visible and is not hidden by other parts. FIG. 5 further shows that the planar surface 37 overlaps more than 50% of the inlet opening 29. This overlap amounts to considerably more than 50%, even more than 70%.

The planar surface 37, which is provided on the side of the outer curve of the pipe bend 16, has the advantage that the liquid flowing through the pipe bend will travel at relatively great speed along the planar surface which counteracts deposits and encrustation of particles in the outer curve of the pipe bend and can even prevent it almost entirely. Such deposits and encrustation are a problem with the known mixing devices and mean that these known mixing devices have to be cleaned at regular intervals.

For further clarification of the drawings in FIGS. 4, 5 and 6, it should be noted that the rotor chamber 24 is delimited upstream of the rotor 25 by a conically widening wall part 47 which, near an edge 49, joins with a widened section in which the rotor 25 is accommodated. The conical wall part 47 and the delimiting edge 49 are indicated in FIG. 4 and in FIG. 6.

Below, the improvement of the operation of the rotor will be discussed in more detail, in particular with reference to FIGS. 4 and 6.

The rotor 25 which is rotatable about axis of rotation 26 during rotation defines a surface of revolution 50 along the circumference of the rotor. The mixing chamber, in particular the rotor chamber 24, has a circumferential wall zone 51 having a substantially circular cross section. This circumferential wall zone 51 surrounds the surface of revolution 50 of the rotor.

In order to improve the operation of the rotor 25, according to the invention at least one rotor rib 54, 55, 56, 57 is provided on the circumferential wall zone 51. This at least one rotor rib extends from the circular circumferential wall zone 51 in the direction of the surface of revolution 50 of the rotor 25.

In FIG. 6, five of these rotor ribs are illustrated. Two of the rotor ribs, both denoted by reference numeral 55, are indicated by means of dashed lines in order to clearly indicate that the number of rotor ribs can vary according to the invention. The rotor ribs 55 can also in any case readily be omitted. Furthermore, it should be noted that the rotor ribs 56 and 57 form a pair which is provided on either side of the inlet 53 of the outlet duct 36. Rotor ribs 56, 57 may be provided, optionally in combination with other rotor ribs. One or more rotor ribs 54, 55 may also be provided, optionally in combination with rotor ribs 56, 57.

Referring to FIG. 6 and assuming that the direction of rotation of the rotor 25 is in the direction indicated by arrow R, the operation of the rotor ribs 54 and optional rotor ribs 55 is as follows. Due to the centripetal forces, the liquid is forced to the outside by the rotor 25 and runs along the inner wall of the mixing chamber in the circumferential wall zone 51. When this liquid, which now runs in the circumferential wall zone 51 along the wall of the mixing chamber, encounters the rotor rib 54 or 55, this liquid will be returned in the direction of the rotor 25 by the rotor rib 54. This course along the circumferential wall zone 51 and return movement of the liquid stream is indicated by means of arrow Q. This return movement results in the liquid being forced into closer contact with the rotor, which thus leads to an improvement in the operation of the rotor. As has been indicated by means of arrow W at rotor rib 56, the operation of rotor rib 56 is similar in this respect.

As can be seen in FIG. 4, the rotor ribs 54 and 56, as well as rotor rib 57 and the optional rotor ribs 55 preferably extend along the entire axial length of the rotor 25.

FIG. 6 furthermore shows that the rotor ribs 54, 55, 56 and 57 all have a substantially triangular cross-sectional shape. This results in the liquid flowing towards the rotor in the direction indicated by arrows Q and W being passed along the inclined surface in the direction of the rotor, so that, as it comes away from the rotor ribs, it has a movement component which is partly in the direction of the rotation of the rotor. This makes it easier to carry this returned liquid along and prevents liquid from collecting along the circumferential wall zone 51.

FIG. 6 furthermore shows that the rotor ribs 54, 55, 56 and 57 have an angular edge 58, 59, 60 extending in the axial direction. This promotes the formation of turbulences in the liquid when moving away from the respective rotor ribs.

The height of the rotor ribs 54, 55, 56 and 57, viewed in the radial direction of the rotor, is in the range from 1 to 3 mm and is approximately 2 mm in FIG. 6. The radial tolerance S between the surface of revolution 50 and the respective rotor ribs is in particular in the range from 0.5 to 2 mm and is approximately 1 mm in FIG. 6, but may also be 2 mm. This prevents an inaccurately dimensioned rotor or a rotor which has not been centred correctly on the rotor shaft from hitting the rotor ribs.

The inlet 53 of the outlet segment 36 is provided near the surface of revolution of the rotor and, more precisely, at least with this exemplary embodiment, partly along the axial front surface of the rotor. Directly adjacent to the inlet 53 of the outlet 36, this inlet 53 is provided on both sides with rotor ribs 56 and 57. Providing rotor ribs 56 and 57 on either side of the inlet 53 of the outlet 36 not only results in the liquid being returned to the rotor at these rotor ribs but also has the effect that this liquid does not flow away so readily via the outlet. This results in the liquid remaining in the rotor chamber for longer. It should be noted that although the inlet 53 of the outlet 36 extends here in the axial plane, this inlet may readily also extend in the tangential plane, in which case the outlet duct will then at least initially bend away in the radial direction.

Figure 7:
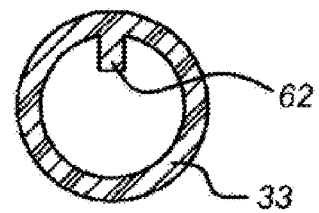
FIG. 7 shows a cross-sectional view in the direction indicated by arrows VII in FIG. 3.
Figure 8:
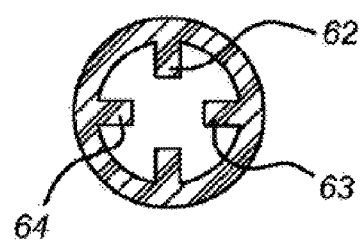
FIG. 8 shows an alternative cross-sectional view corresponding to that of FIG. 7.

Referring in particular to FIGS. 3, 7 and 8, an improvement to the outlet duct will now be discussed in more detail. It is known precisely due to the desired operation of the rotor that the liquid flowing through the outlet duct 36, 33 swirls, which leads to turbulences when it flows into a cup or beaker. In order to prevent these turbulences, it is known to provide the discharge mouth, that is to say the end of the discharge, with specific features. The inventors have now found that the turbulent flow can readily be turned into a smooth flow by providing a rib in the outlet duct 36, 33 which extends in the longitudinal direction of the outlet duct. This rib has a guiding effect on the flow through the outlet duct and smoothes this flow out. Surprisingly, in this case, the quality of the liquid, such as foam which is produced therein and the like, is not noticeably affected, or hardly noticeably affected at all.

In the exemplary embodiment shown in the drawings, this at least one rib is arranged in the discharge part 33. The discharge part 33 from FIG. 3 is shown in cross section in FIG. 7. As can be seen here, a rib 62 is arranged on the inside of the outlet duct, in this case therefore inside the discharge part 33. This rib 62 extends in the longitudinal direction of the outlet duct. In particular, the rib 62 extends parallel to the longitudinal direction of the outlet duct. Furthermore, the rib 62 preferably extends along the entire curve of the discharge part. Since the latter is in this case a pipe bend 33, the rib 62 will therefore then follow the curve, as can also be seen in FIG. 3. It was found to be particularly advantageous to arrange this at least one rib 62 on the section of the pipe bend 33 which is situated nearest to the side of the outer curve. The liquid is forced to the outside in the pipe bend and will thus be subjected to the guiding action of rib 62 to the greatest possible extent.

FIG. 8 shows an alternative embodiment of the discharge part 33 in cross section. In this case, three additional ribs 63, 64 are provided in addition to rib 62 from FIG. 7. Thus, a cross-shaped cross-sectional shape is achieved.

As can be seen in FIG. 3, the outlet duct is composed of a first section 36 which is integrally formed with the housing 32 of the mixing chamber 13, 16, 24, and a second section 33, the discharge part. If desired, a third section may also be provided between the first section 36 and the second section 33. Such a third section may, for example, be a pipe if the discharge 33 is not directly connected to the first section 36. By not providing the first section 36 with guiding ribs, a universal housing part can be used and the ribs in the second or third section can be specifically adapted to the desired purpose, in particular to the liquid to be passed through the outlet duct. The requirements placed on the guiding ribs are different for a highly foaming liquid to those for a liquid which produces little foam or a soup liquid.

The discharge part 33 in FIG. 3 comprises a bend so that the direction changes from horizontally flowing to substantially vertically flowing. The outflow end 65 of the discharge part 33 is turned downward. FIG. 3 furthermore shows that the side of the outer curve 66 of the outflow end 65 is lower than the side of the inner curve 67. This promotes a smooth flow from the discharge part.

FIG. 3 furthermore shows that the rib 62 projects from the outflow end 65 in a downward direction with an end 68. This assists the last remains of liquid in coming out of the discharge part after a beaker or cup has been filled and thus limits dripping. Said dripping may in this case be limited even further by the projecting rib end 68 tapering conically in the direction of the longitudinal axis of the outlet duct, as is indicated by means of arrow 69 in FIG. 3.

Below, extending the service life of the electromotor 23 will be discussed in more detail, substantially with reference to FIGS. 2 and 3.

As can be seen in FIG. 3, a rear wall 19 of the rotor chamber 24 is situated behind the rotor 25. This rear wall is in this connection referred to as first wall part. This first wall part 19 is provided with a shaft seal 21 through which the drive shaft 26 protrudes into the rotor chamber. As is known per se, there is an intermediate space 70 behind the first wall part 19. In devices known from the prior art, this intermediate space 70 is a substantially closed space with two passages, i.e. the passage in the shaft seal 21 and another passage in a second wall part 71 via which the shaft enters the intermediate space 70. When the shaft seal 21 starts to leak as a result of wear or through another cause, the intermediate space 70 will fill up. After some time, the liquid will then end up in the electromotor and the latter will fail.

The present invention now proposes to provide an indicator system which gives an indication as soon as liquid has entered the intermediate space 70. This then makes it possible to call a maintenance engineer at an early stage so that the shaft seal can be replaced instead of the electromotor 23 which would otherwise have failed after some time. Such an indicator system can be produced by means of sensors. However, according to the invention this indicator system is produced in a very simple manner and such that it is fail-safe by providing the intermediate space 70 with a leakage drain 22 at the bottom side, which discharges liquid which has entered the intermediate space to an indicator, in the form of a simple collecting surface or a simple collecting tray. The liquid then flows via the leakage drain 22 to a collecting surface. In the present case, the collecting surface is simply the bottom 75 of the door at the front. When the user opens the door 6 in order to refill the containers for instant powder, he/she will automatically see whether any liquid has leaked. In that case, the user has to contact maintenance staff who can then replace the shaft seal 21. As all this takes place at an early stage, the beverage-making device 1 can continue to operate as normal and does not have to be taken out of service in order to wait for maintenance staff to attend to the problem.

According to the invention, it is advantageous if the shaft seal 21 is fitted in the mixing device according to the invention as a separate part, optionally in combination with the entire first wall part 19, so as to facilitate replacement of the shaft seal 21.

It will in itself be clear that a collecting surface or, if desired, a collecting tray for leaked liquid can also be attached to the mixing device itself and thus forms part of the mixing device itself instead of forming part of the beverage-making device.

Examples of beverages which may be prepared using a mixing device according to the invention or a beverage-making device according to the invention, respectively, include: tea, iced tea, frappé coffee (iced coffee), (cold) lemonade, soup, bouillon, (artificial) fruit juice, health drinks—such as AA-drink®. All of these beverages can in principle either be made using an instant powder or using an instant liquid—so-called 'liquid ingredient'.

The invention claimed is:

1. A Mixing device for mixing a liquid, such as water, with an instant ingredient to form a beverage, the mixing device comprising:
   a mixing chamber;
   a rotor which, during rotation about an axis of rotation, defines a surface of revolution extending along a circumference of the rotor;
   wherein the rotor is arranged in the mixing chamber;
   wherein the mixing chamber comprises a peripheral wall zone having a substantially circular cross section, which peripheral wall zone surrounds the surface of revolution and comprises a peripheral wall part extending in the direction of the axis of rotation and a transverse wall part which is perpendicular to the axis of rotation;
   wherein an outlet duct for discharging a mixture formed is connected to the mixing chamber, an inlet of which is provided in the transverse wall part at the rotor;
   characterized in that
      at least one rotor rib is provided at the peripheral wall zone on either side of the inlet; and
      wherein the rotor rib extends from the peripheral wall zone in a direction of the surface of revolution of the rotor,
      the rotor rib extending along an entire axial length of the rotor.

2. The Mixing device according to claim 1, wherein the at least one rotor rib, viewed in a plane at right angles to the axis of rotation, has a triangular cross-sectional shape.

3. The Mixing device according to claim 1, wherein the at least one rotor rib comprises an angular edge extending in an axial direction.

4. The Mixing device according to claim 1, wherein the at least one rotor rib, viewed in a radial direction of the rotor, has a height of 1-3 mm, and wherein the radial tolerance (S) between the surface of revolution and the at least one rotor rib is 0.5 to 2 mm, such as approximately 1 mm.

5. The Mixing device according to claim 1, wherein the inlet of the outlet duct is provided at the surface of revolution of the rotor and the outlet duct extends in an axial direction of the rotor at this inlet; and in which said at least one rotor rib is provided on both sides of and adjacent to the inlet of this outlet duct.

6. The Mixing device according to claim 1, wherein:
   the rotor has a rear side which is delimited by a rear rotor housing wall;
   the mixing chamber is designed to supply the mixture comprising liquid and instant ingredient from a front side of the rotor to the rotor;
   the front side of the rotor is partially delimited by a front rotor housing wall; and
   the inlet of the outlet duct is provided in the front rotor housing wall.

7. The Mixing device according to claim 1, furthermore comprising a motor which is connected to the rotor for drive purposes.

8. A method for preparing an instant beverage, such as coffee, soup, hot cocoa, tea, bouillon, lemonade or fruit juice utilizing the mixing device of claim 1.

9. A Beverage-making device for preparing an instant beverage, the beverage-making device comprising:
   at least one mixing device comprising
      a mixing chamber;
      a rotor which, during rotation about an axis of rotation, defines a surface of revolution extending along a circumference of the rotor;
      wherein the rotor is arranged in the mixing chamber;
      wherein the mixing chamber comprises a peripheral wall zone having a substantially circular cross section, which peripheral wall zone surrounds the surface of revolution and comprises a peripheral wall part extending in the direction of the axis of rotation and a transverse wall part which is perpendicular to the axis of rotation;
      wherein an outlet duct for discharging a mixture formed is connected to the mixing chamber, an inlet of which is provided in the transverse wall part at the rotor;
      characterized in that
         at least one rotor rib is provided at the peripheral wall zone on either side of the inlet; and
         wherein the rotor rib extends from the peripheral wall zone in a direction of the surface of revolution of the rotor,
         the rotor rib extending along an entire axial length of the rotor;
   a water supply system for the supply of water to an inlet mouth to the mixing chamber of the at least one mixing device;
   at least one storage container for instant ingredient; and
   a powder supply duct which connects the storage container to an access opening to the mixing chamber of the at least one mixing device.

* * * * *